United States Patent [19]

Sanders

[11] Patent Number: 4,477,423

[45] Date of Patent: Oct. 16, 1984

[54] ZEOLITE Y

[75] Inventor: Robert N. Sanders, Baton Rouge, La.

[73] Assignee: Ethyl Corporation, Richmond, Va.

[21] Appl. No.: 489,478

[22] Filed: Apr. 28, 1983

Related U.S. Application Data

[63] Continuation-in-part of Ser. No. 299,885, Sep. 8, 1981, abandoned.

[51] Int. Cl.$^3$ .............................................. C01B 33/28
[52] U.S. Cl. ...................................... 423/328; 502/79
[58] Field of Search ..................... 423/328; 502/60, 79

[56] References Cited

U.S. PATENT DOCUMENTS

| | | | |
|---|---|---|---|
| 3,130,006 | 4/1964 | Rabo et al. | 423/328 |
| 3,442,794 | 5/1969 | Van Helden et al. | 208/111 |
| 3,691,099 | 9/1972 | Young | 423/328 |
| 4,093,560 | 6/1978 | Kerr et al. | 502/60 |

Primary Examiner—Edward J. Meros
Attorney, Agent, or Firm—Donald L. Johnson; John F. Sieberth; Paul H. Leonard

[57] ABSTRACT

A zeolite Y having a relatively high or improved crystallinity is produced by making a water slurry of a zeolite Y having a relatively low or poor crystallinity, adding acid and bring the pH of the slurry to a range of about 7 to 12, refluxing the slurry until the desired crystallinity has been obtained, and then separating and drying the solids.

5 Claims, No Drawings

ZEOLITE Y

CROSS REFERENCE TO RELATED APPLICATION

This is a continuation-in-part of U.S. application Ser. No. 299,885, filed on Sept. 8, 1981, now abandoned.

FIELD OF THE INVENTION

The present invention is in the general field of synthetic sodium alumino silicates especially zeolite and particularly zeolite Y.

DESCRIPTION OF THE PRIOR ART

Zeolite Y is a synthetic faujasite and may be described as follows:

$$0.9 \pm 0.2 Na_2O:Al_2O_3:4.5 \pm 1.5 SiO_2 yH_2O$$

"y" may be any value up to 9.

Procedures for making zeolites Y are described in the literature with detailed processes set forth in U.S. Pat. Nos. 3,013,982; 3,130,007; 3,910,798 and 4,164,551.

With some starting materials and methods used in the manufacture of zeolite Y, it is very difficult to obtain a product that has high crystallinity, a good silica to alumina oxide molar ratio and also have a high starting silicon utilization. The present invention provides a relatively simple means of treating a zeolite Y of low crystallinity to product a zeolite Y having the desired properties.

SUMMARY OF THE INVENTION

It is a principal object of the present invention to provide a zeolite Y of a relatively high crystallinity.

Another object of the invention is to provide post-treatment of a zeolite Y of a relatively low crystallinity to produce a zeolite Y of relatively high crystallinity.

A water slurry of the zeolite Y to be treated is prepared and then treated with acid to adjust the pH to a range of about 7 to 12. The acid treated slurry is then refluxed for a sufficient period of time to form a desired amount of solids. The solids are then separated, dried and recovered. The product is a Zeolite Y of relatively high crystallinity.

DESCRIPTION OF THE PREFERRED EMBODIMENTS

In carrying out the process of the invention, a water slurry is made with the zeolite Y to be treated.

In general, the pH of the zeolite Y-water slurry will be about 11 or higher. The initial pH depends largely on three factors as follows:

1. The extensiveness of washing the zeolite Y in distilled water.
2. The amount of solid zeolite Y in the slurry.
3. The amount of water in the slurry.

Theoretically, if the zeolite Y was totally washed with distilled water, the pH would be reduced to seven (7). This, of course, is impractical and mere washing will not increase the crystallinity of the zeolite Y.

The pH of the zeolite-water slurry is then reduced or brought to a range of about 7 to 12 and preferably to a range of about 7 to 8 by adding to the slurry a sufficient quantity of acid. Any suitable acid may be used, but concentrated hydrochloric acid is preferred. Subsequently, the acid treated zeolite-water slurry is refluxed for a period of time sufficient to produce the degree of crystallinity desired. About 5 to 6 hours of refluxing has been found to be adequate. The solids are then separated, dried and recovered. Separation by filtration is preferred. A product of relatively high crystallinity is produced, i.e., one having substantially greater crystallinity than that of the zeolite Y prior to treatment.

Several zeolite Y products of relatively low crystallinity, which had been prepared in the laboratory in accordance with procedures set forth in my copending application Ser. No. 299,878, filed on Sept. 8, 1981, now U.S. Pat. No. 4,400,366 were treated to improve the crystallinity thereof. The product to be treated was stirred with about 1 to 3 times its weight of water. Hydrochloric acid was than added to bring the pH of the solution or acid-treated zeolite-water slurry to about 7 to 8. The slurry was then refluxed for about six hours. The results are shown in Tables I and II hereinafter.

TABLE I

| | pH of Zeolite Y-Water Slurry | | |
|---|---|---|---|
| Run | Starting Material | Initial pH | pH Immediately After Acid Treatment |
| 1 | A | >11 | 7.5–8.0 |
| 2 | B | >11 | 7.5–8.0* |
| 3 | C | >11 | 7.5–8.0 |

*After approximately 8 hours pH had risen to 8.9.

The entire process or treatment is on the basic side. The addition of the acid effectively reduces the pH of the zeolite Y-water slurry, but is not so great as to move the pH to the acidic side.

TABLE I

| | Crystallinity Improvement | | |
|---|---|---|---|
| Run | Starting Material | Starting Crystallinity | Product Crystallinity |
| 1 | A | 6% | 28% |
| 2 | B | 19% | 66% |
| 3 | C | 57% | 95% |

Crystallinity was measured in accordance with the disclosure in said copending application Ser. No. 299,878 and the disclosure of said application is incorporated herewith.

The foregoing disclosure and description of the invention is illustrative and explanatory thereof and various changes may be made within the scope of the appended claims without departing from the spirit of the invention.

What is claimed is:

1. A method of improving the crystallinity of zeolite Y, comprising the steps of,
   (a) making a water slurry of the zeolite Y to be treated;
   (b) adding a sufficient quantity of acid to adjust the pH of the zeolite Y-water slurry to about 7 to 8;
   (c) refluxing the slurry for a sufficient period of time to substantially increase the crystallinity of the zeolite Y;
   (d) separating the solids from the slurry;
   (e) drying the solids, and
   (f) recovering a zeolite Y product of improved crystallinity.

2. The method of claim 1, wherein the acid is hydrochloric acid.

3. The method of claim 1, wherein the refluxing is carried out for about 5 to 6 hours.

4. The method of claim 1, wherein separation of the solids is by filtration.

5. The method of claim 1, wherein in step (a), the pH of the zeolite Y-water slurry is about 11 or higher.

* * * * *